(12) United States Patent
Rincker et al.

(10) Patent No.: US 7,900,871 B2
(45) Date of Patent: Mar. 8, 2011

(54) WING LEADING EDGE HAVING VORTEX GENERATORS

(75) Inventors: Gregory A. Rincker, Wichita, KS (US); Kenton A. Cleveland, Wichita, KS (US); James L. Hammer, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 147 days.

(21) Appl. No.: 11/781,020

(22) Filed: Jul. 20, 2007

(65) Prior Publication Data
US 2009/0020652 A1    Jan. 22, 2009

(51) Int. Cl.
*B64D 1/00* (2006.01)

(52) U.S. Cl. ........................ 244/134 A; 244/198; 244/200

(58) Field of Classification Search ............. 244/134 A, 244/200, 200.1, 130, 198, 214
See application file for complete search history.

(56) References Cited

U.S. PATENT DOCUMENTS

| | | | |
|---|---|---|---|
| 2,440,240 A | | 4/1948 | Antonson |
| 2,800,291 A | * | 7/1957 | Stephens ................. 244/200 |
| 3,463,418 A | * | 8/1969 | Miksch ................. 244/200.1 |
| 3,578,264 A | * | 5/1971 | Kuethe ................. 244/200.1 |
| 3,693,916 A | | 9/1972 | Tritt et al. |
| 4,561,613 A | * | 12/1985 | Weisend, Jr. ............. 244/134 A |
| 4,650,138 A | * | 3/1987 | Grose ................. 244/130 |
| 4,779,823 A | * | 10/1988 | Ely et al. ................. 244/134 A |
| 5,058,837 A | * | 10/1991 | Wheeler ................. 244/200.1 |
| 5,074,497 A | * | 12/1991 | Phillips, II ................. 244/134 D |
| 5,156,362 A | * | 10/1992 | Leon ................. 244/200.1 |
| 5,191,791 A | | 3/1993 | Gerardi et al. |
| 5,206,806 A | | 4/1993 | Gerardi et al. |
| 5,253,828 A | | 10/1993 | Cox |
| 5,337,978 A | * | 8/1994 | Fahrner et al. ............ 244/134 A |
| 5,598,990 A | * | 2/1997 | Farokhi et al. ............. 244/200.1 |
| 6,427,948 B1 | | 8/2002 | Campbell |
| 2004/0037162 A1 | * | 2/2004 | Flohr et al. ................. 366/181.5 |
| 2007/0018056 A1 | | 1/2007 | Narramore |

OTHER PUBLICATIONS

Van Dam, C.P. and Holmes, B.J.; Boundary-Layer Transition Effects On Airplane Stability and Control, Journal of Aircraft; vol. 25; No. 8; pp. 702-709; Aug. 1988.

* cited by examiner

*Primary Examiner* — Timothy D Collins
*Assistant Examiner* — Justin Benedik
(74) *Attorney, Agent, or Firm* — Lathrop & Gage LLP

(57) ABSTRACT

An arrangement of devices as well as a method for improving the aerodynamics of an aircraft wing are disclosed. In embodiments, a plurality of vortex generators are attached in span-wise alignment on an deice boot along the wing's leading edge. The vortex generators are, in embodiments, constructed of a flexible material such that they are able to be expanded along with the boot during inflation and deflation thus mechanically involving the aerodynamic devices in the ice-shedding process.

14 Claims, 2 Drawing Sheets

WING LEADING EDGE HAVING VORTEX GENERATORS

BACKGROUND OF THE INVENTION

1. Field of the Invention

The invention relates generally to aerodynamics. More specifically, the invention relates to the field of aircraft wing design.

2. Description of the Related Art

The accumulation of ice and other contaminants on aircraft wings has been an ongoing problem. With respect to ice buildup, artisans have taken a number of approaches to dealing with the problem. Some solutions have involved the administration of heat to the leading edge or other locations on the wing. Other techniques involve the use of chemicals to induce shedding. Additional solutions have involved the use of mechanical arrangements.

One mechanical arrangement involves the use of what is referred to as a "deice boot." Deice boots include flexible sheets of rubber which are adhered to the leading edge of the wing and have span-wise inflatable tubes which are stitched into the rubber matting. When the tubes are inflated, the boot causes the accumulated ice to be pushed away from the leading edge surface. This allows the free stream of impinging air to strip the ice off of the wing and then carry it away. The boot is then deflated, but will be periodically reinflated to help minimize the amount of ice which collects on the wing. Thus, the cycled expansions mitigate the ice problem, but do not eliminate it completely.

One problem created by residual ice occurs at or near a stall. A stall is an aerodynamic condition in which the angle of an aircraft wing's chord line and the incoming air (the angle of attack) increases to a point that the lift begins to decrease. The angle at which this transition occurs is called the critical angle of attack. The critical angle depends on many wing design parameters, but normally represents the boundary between the wing's linear and nonlinear airflow regimes. Once the critical angle is reached, flow separation occurs. This flow separation dramatically decreases lift (sometimes suddenly), increases drag, and immediately shifts the aircraft's pressure center forward.

Depending on the aircraft's design, a stall can expose extremely adverse properties of balance and control—even in ideal conditions. But these issues are exacerbated when the aerodynamically ideal wing surfaces become contaminated with some foreign substance, such as ice or frost. Ice, frost, or other contaminating surface roughness can increase the speed at which the stall occurs. Thus, conventionally, ice buildup has been shown to interfere with control, especially as the speed and attack angle are near or at stall conditions.

SUMMARY

The present invention is defined by the claims below. Embodiments of the present invention include an aircraft wing which has a deice boot. At least one protrusion exists on the deice boot. The deice boot, in some embodiments, includes a plurality of air tubes which extend in a span-wise direction. These air tubes can be inflated and then cyclically deflated to break off ice.

The protrusion is adapted such that it minimizes flow separation from the wing, especially when the aircraft approaches stall conditions. Structurally speaking, this flow separation minimization, in one embodiment, is achieved by configuring the protrusions such that each has a ramped upper face and two laterally converging sides. In some embodiments the protrusions are vortex generators.

In terms of orientation, the protrusions, in embodiments, are disposed such that each has a longitudinal axis which is vertically oriented; straddles a forward most point of the wing leading edge; and converges towards a vertical rear edge. In further embodiments the protrusions, when viewed in cross section, are located on the leading edge such that they partially overlap with, but are clocked slightly backward from the forward-most point of the leading edge.

In some embodiments the protrusions are comprised of a flexible material which is able to flex with said boot during operation. In some embodiments, the protrusion will be constructed of neoprene rubber. In other embodiments, the boot will also be constructed of the same neoprene material and thus, both the boot and protrusion are comprised of the same material.

In other embodiments, an aerodynamic device is provided. This aerodynamic device has a ramping upper face and two laterally converging sides and is able to be fixed onto and operational with a deice boot on a leading edge of an aircraft wing.

A method is also disclosed. Embodiments of the method include improving the aerodynamics of an aircraft wing by (i) providing a flexible inflatable member; (ii) installing the flexible inflatable member along the leading edge of an aircraft for the purpose of preventing ice buildup by inflating and deflating it; and attaching one or more aerodynamic devices to the inflatable member for the purpose of generating vortices.

In embodiments, the method includes constructing the aerodynamic devices of a flexible material such that said devices are able to flex along with said inflatable member which is also, in embodiments, constructed of a flexible material. For example, both could be constructed of a neoprene material in embodiments. In a further embodiment, the devices are adapted such that they minimize flow separation when the aircraft approaches a stall.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
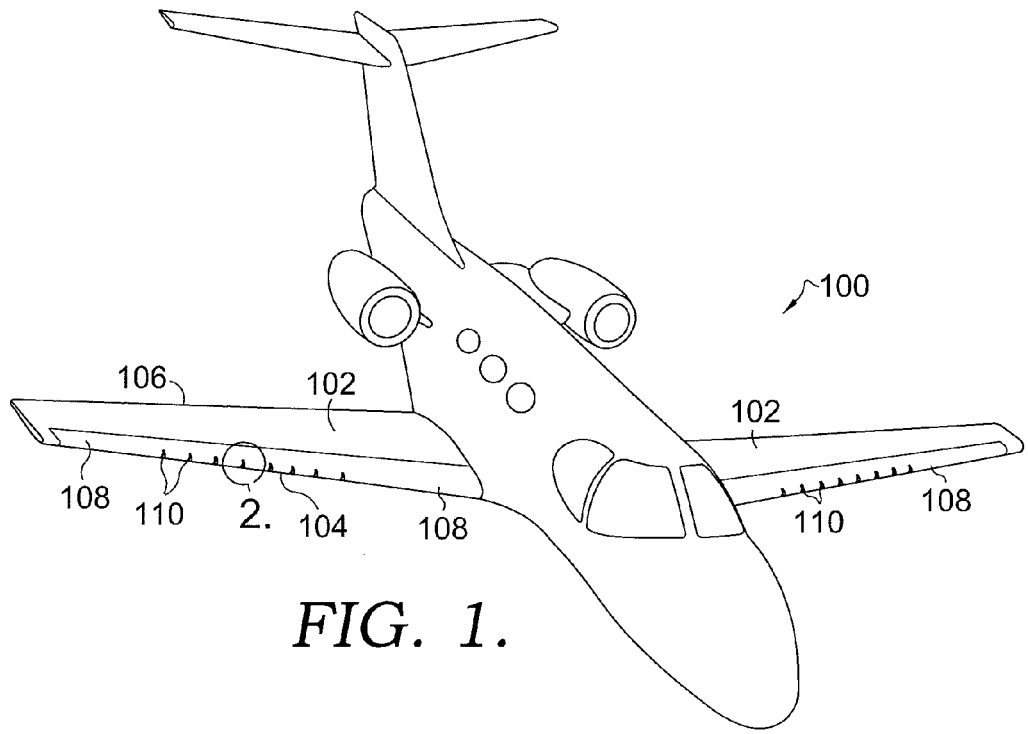
FIG. 1 is a perspective view showing an embodiment for an aircraft incorporating the disclosed devices and methods.

An embodiment for an aircraft 100 is shown in FIGS. 1-5. As can be seen from the figure, aircraft 100 includes first and second wings 102. One will understand that the configuration of each is the flip-side equivalent of the other. Each wing has a leading edge 104 and a trailing edge 106. With respect to each, the leading edge 104 includes a deice boot 108.

One skilled in the art will recognize that devices like boot 108 typically are constructed of a flexible material which is capable of being elastically expanded out, and then contracted back while maintaining structural integrity. In one embodiment, this boot is constructed of neoprene rubber, which is a well-known synthetic material which is abrasion-resistant, chemical-resistant, waterproof, and elastic. It is, of course, possible that boot 108 could be constructed of other materials.

Functionally speaking, boot 108 is expanded using a plurality of spanwise extending inflatable tubes which are stitched into the neoprene matting in a known manner. When the tubes inflate, this causes accumulated ice to be shed away from the leading edge surface and then carried off by the high velocity impinging air. The boot is then deflated and then cyclically reinflated in a known manner.

In the FIG. 1 embodiment, at least one protrusion 110 is attached to boot 108. A plurality of these protrusions are shown in FIG. 1. Each of the protrusions, in one embodiment, are adhered to the boot using an adhesive or some other known bonding technique. The protrusions could be adhered before or after installation of the boot. In some instances it is desirable to adhere the protrusions after the boot has already been installed on the aircraft to avoid improper positioning, which might affect aerodynamics. Alternatively, the protrusions could be manufactured integrally with the boot by known processes, or connected using some fastening mechanism or system. FIG. 3 shows the flexible nature of these protrusions 110 and how they might be positioned and then adhered to the leading edge. FIG. 5 shows the FIGS. 1-4 embodiment as it appears before installation.

In one embodiment, each of these protrusions 110 are constructed of a flexible material such that they are able to be expanded along with the boot. In an embodiment, neoprene rubber is used as the material—the same material the boot is constructed of. This material selection makes the protrusion elastically expandable along with the boot during deicing. Thus, the protruding vortex generator devices 110 are actively involved in the mechanical removal of the ice. Because of this, ice may also be shed from the protrusion itself, as well as the rest of the boot more effectively during the inflate/deflate cycling.

These protrusions 110, because of their shapes, are aerodynamically active, and in the FIG. 1-5 embodiments, the protrusions are vortex generators. As is known in the art, vortex generators are aerodynamic devices which create vortices and are often used in aircraft design. They are useful here in that their location and orientations at the leading edge tends to maintain attached airflow over the control surfaces at the rear of the wing. Here they are sloped and substantially triangular, but one skilled in the art will recognize that numerous other shapes (e.g., angled raised walls, curved sides, give shaped) might be used as well and would still fall within the scope of these disclosures. Here, the vortex generators 110 run in a span-wise line across the front of each wing. It should be noted that, although some shedding from the vortex generators may be experienced, that the devices will still have the desired aerodynamic functionality even if coated with ice.

Figure 2:
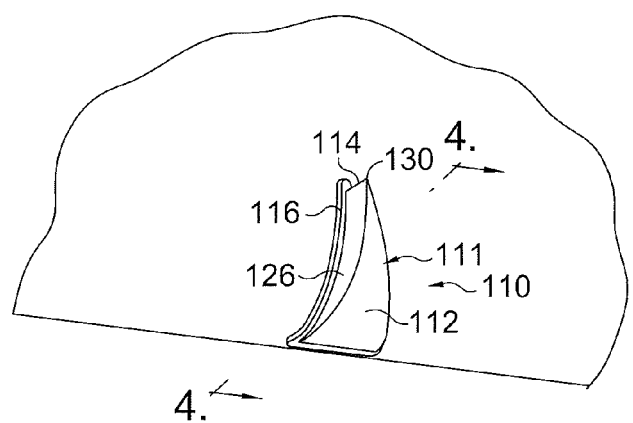
FIG. 2 is a breakout view of area—2—in FIG. 1.
Figure 3:
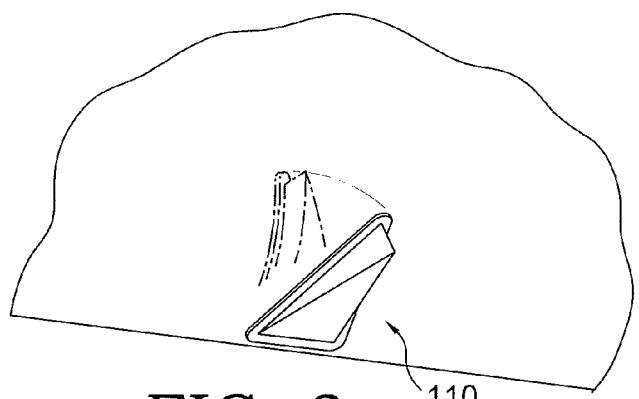
FIG. 3 is a breakout view showing how the aerodynamic device of FIG. 2 is adhered.
Figure 4:
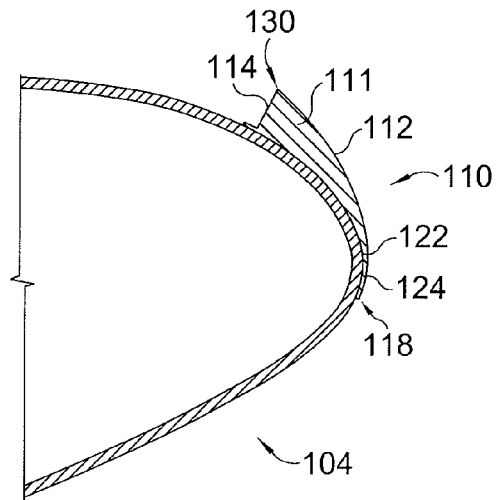
FIG. 4 is a cross-sectional view showing one embodiment for an orientation of an aerodynamic device on the leading edge of an aircraft.
Figure 5:
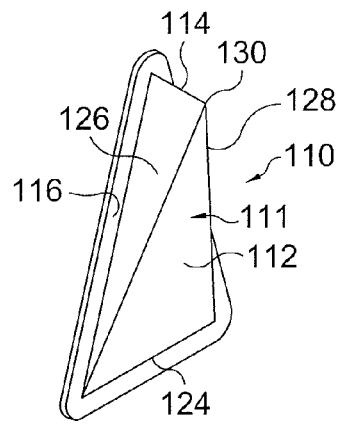
FIG. 5 is a perspective view of one embodiment for an aerodynamic device before installation.

The protrusion configuration details may best be seen as they appear after installation in FIG. 2, and are shown in FIG. 4 as they appear before installation. As can be seen, each aerodynamic protrusion 110 includes an outer margin 116. Each protrusion also includes a protrusion body 111. Protrusion body 111 (which includes all of protrusion 110 except for margin 116) begins at a forward edge 124 and then has an upper face 112 which ramps upward until it reaches a terminal point of convergence 130. Protrusion 110 is further configured with two lateral walls/sides 126 and 128 which converge into a rear terminus 114 which is substantially normal (when installed) to the leading edge surface.

The orientation of the protrusion on the wing leading edge can best be seen in FIG. 4. Referring to the figure, the protrusions 110, are disposed such that each has a longitudinal axis which is then conformed (upon installation) tangentially around the leading edge surface; slightly overlaps a forward most point 122 of the wing leading edge 104; and diverges from the forward edge 124 to the rear normal terminus 114. Further, it can be seen in FIG. 4 that the overlap by the leading edge 124 of protrusion 110 with the foremost point 124 of the leading edge 104 is slight, and that substantially most of the rest of the device 110 is positioned such that it is clocked backward from point 124 (when viewed in cross section).

In terms of aerodynamic function, these vortex generators 110, in embodiments, create two tip vortices which draw energetic, rapidly-moving air from outside the slow-moving boundary layer into contact with the aircraft skin. The boundary layer normally thickens as it moves along the aircraft surface. Thus, the vortex generators disclosed in the figures can be used to reenergize the boundary layer. Vortex generators 110 will provide this benefit regardless of weather conditions, especially at near-stall conditions where the vortex generators will noticeably improve handling characteristics.

The vortex generators, however, have also been shown to perform especially well in preventing premature stall conditions caused by ice buildup and/or other contamination of the wing in adverse weather conditions. Again, the deice boot structures 108 do not remove all of the ice buildup. But the vortex generators 110 minimize the separated flow created by the residual ice (the ice not removed by boot activation) to the extent that aircraft handling characteristics are not compromised.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An aircraft wing, comprising:
   a deice boot comprised of a flexible expandable material; and
   a plurality of protrusions on said deice boot for minimizing flow separation;
   wherein each of said protrusions has a ramped upper face spanning two sides of the protrusion wherein the sides laterally converge from a forward edge of the protrusion to a rear end thereof;
   each of said protrusions being sufficiently flexible such that said protrusions expand along with said deice boot in order to actively participate in the mechanical removal of ice;
   each of said protrusions being enclosed by said ramped upper face.

2. The wing of claim 1 wherein each of said protrusions is a vortex generator.

3. The wing of claim 1 wherein said deice boot includes a plurality of air tubes which extend in a span-wise direction.

4. The wing of claim 1 wherein each of said protrusions: (i) conforms to an outer surface of the leading edge; and (ii) overlaps a forward most point of the wing leading edge.

5. The wing of claim 4 wherein each of said protrusions terminate at a rear edge substantially normal to the leading edge surface.

6. The wing of claim 3 wherein said protrusion, when viewed in cross section, is affixed to said leading edge such that it overlaps said leading edge and is positioned slightly backward from said forward-most point of said leading edge.

7. An aerodynamic device, said device comprising:
   a ramped upper face completely enclosing said device and spanning two sides laterally converging from a forward edge of the face to a rear end thereof, wherein said device is affixed onto an expandable deice boot on a leading edge of an aircraft wing, said device being constructed of a flexible material such that it is able to participate along with said deice boot in mechanically removing ice from said forward edge.

8. The device of claim 7 wherein said device functions to generate vortices.

9. A plurality of the aerodynamic devices of claim 7 disposed span-wise on said deice boot.

10. The plurality of aerodynamic devices of claim 9 wherein each device in said plurality (i) longitudinally conforms with a surface of said leading edge; and (ii) overlaps a forward-most point of the wing leading edge.

11. The plurality of aerodynamic devices of claim 10 wherein each device in said plurality, when viewed in cross section, is affixed to said leading edge such that a substantial part of said device is positioned slightly backward from said forward-most point of said leading edge.

12. The device of claim 7 comprised of flexible neoprene material.

13. A method of improving the aerodynamics of an aircraft wing, said method comprising:
    installing a flexible inflatable member along the leading edge of an aircraft wing for preventing ice buildup by inflating and deflating said member; and
    attaching a plurality of aerodynamic devices span-wise on said inflatable member to generate vortices;
    constructing said aerodynamic devices of a flexible material such that each of said devices is able to flex along with said inflatable member in mechanically removing ice, each aerodynamic device having a ramped upper face completely enclosing said device, said face spanning two sides of said device wherein the sides laterally converge from a forward edge of the device to a read end thereof.

14. The method of claim 13 comprising:
    adapting said devices such that they minimize flow separation when the aircraft approaches a stall.

\* \* \* \* \*